United States Patent

Bonneville et al.

[11] Patent Number: 5,280,747
[45] Date of Patent: Jan. 25, 1994

[54] ESPRESSO COFFEE MACHINE

[75] Inventors: Jean-Francois Bonneville, Limas; Bernard Beillard, Lyons, both of France

[73] Assignee: Seb S.A., Selongey, France

[21] Appl. No.: 982,671

[22] Filed: Nov. 20, 1992

[30] Foreign Application Priority Data

Nov. 20, 1991 [FR] France ............... 91 14323

[51] Int. Cl.⁵ ............................................. A47J 31/34
[52] U.S. Cl. ........................................ 99/287; 99/295; 99/297; 99/302 R
[58] Field of Search .................. 99/287, 295, 302 R, 99/297, 302 P; 426/433

[56] References Cited

U.S. PATENT DOCUMENTS

| 2,205,290 | 6/1940 | Herrera | 99/302 R |
| 3,266,410 | 8/1966 | Novi | 99/287 |
| 4,426,919 | 1/1984 | Rhoten | 99/302 R |
| 4,796,521 | 1/1989 | Grossi | 99/287 |

FOREIGN PATENT DOCUMENTS

| 0184561 | 6/1986 | European Pat. Off. |
| 0321773 | 6/1989 | European Pat. Off. |
| 1319958 | 1/1963 | France |
| 1373832 | 8/1964 | France |

Primary Examiner—Robert W. Jenkins
Attorney, Agent, or Firm—Young & Thompson

[57] ABSTRACT

An espresso coffee machine has a vertically movable snout that supplies hot water under pressure of a pump (13), to coffee (8) held in a filter (7) on a stationary support (9). The snout (10) which penetrates inside the filter (7), is mounted on the first part (22) of a hydraulic jack (21) actuated by the pressurized water supplied by the pump (13). The second part (88) of the jack is adapted to be moved against the action of an antagonistic spring (98) in order to permit the optimum deployment of the jack (21) when the snout (10) is in contact with the ground coffee (8) in the filter (7). This construction is useful for limiting the mechanical stresses on the component parts of the jack, and the pressure exerted by the snout on the ground coffee.

12 Claims, 3 Drawing Sheets

ESPRESSO COFFEE MACHINE

EP-A-0,184,561 discloses an espresso coffee machine, comprising at least one boiler for heating pressurized water supplied by a pump and intended to be injected into the ground coffee contained in the filter means placed on a support, and a snout adapted to penetrate, during each operating cycle of the machine, inside the filter means so as to compress said ground coffee, and mounted in a sliding manner relative to the chassis of the machine by means of at least one hydraulic control jack actuated by the water supplied by said pump, the machine also comprising means forming a flap valve preventing the passage of the water from the boiler toward the filter means while the pressure of the water downstream of the pump is below a predetermined minimum value, the snout being carried by a first part, cylinder or piston, which is movable relative to the second part, piston or cylinder, which is connected to the chassis of the machine, of said jack.

In one embodiment of this machine, the support of the filter means is stationary. The ground coffee is thus compressed by the snout with a force corresponding to the maximum pressure of the water, which may reach approximately 15 bars. This compression may be excessive, particularly if the coffee is finely ground.

The aim of the present invention is to remedy the abovementioned drawbacks of known machines and to propose an improvement to these machines which is capable of eliminating said drawbacks and, furthermore, of offering the additional advantages of simplicity of manufacture and reliability of operation.

According to the invention, the espresso coffee machine of the abovementioned type is defined in that the support of the filter means is stationary, in that the second part of the jack is mounted so a to be able, through the action of the pressurized water supplied by the pump, to be moved relative to the chassis of the machine against the action of means forming an antagonistic spring when the first part is immobilized because the snout is in contact with the ground coffee, in order to permit, before the opening of the means forming a flap valve, the optimum deployment of the jack, this optimum deployment being limited by halting means so as to limit the force of compression of the ground coffee by the snout.

Thus, the support of the filter means is stationary, which simplifies its production and its operation. The second part of the jack moves with respect to the chassis of the machine and the halting means limit the force of compression of the ground coffee by the snout.

According to a noteworthy version of the invention, the halting means consist of means for preventing the intake, inside the chamber of the jack, of pressurized water coming from the pump when the pressure of this water reaches a predetermined maximum value below the pressure causing the opening of the means forming a flap valve.

Since the intake of the water in the chamber of the jack is cut off, the deployment of the jack ceases immediately. The force of compression of the ground coffee by the snout is proportional to the pressure of the water thus contained inside the chamber of the jack. It will also be seen that the component parts of the jack are subjected to said pressure and no longer to the maximum pressure, which may reach 15 bars, of the water supplied by the pump of the machine. These component parts, subjected to lower stresses, may be of simpler construction.

According to an advantageous version of the invention, the preventing means comprise a second hydraulic isolating jack also actuated by the pressurized water coming from the pump, and a first part, movable with respect to the second part, of said second isolating jack moves against the action of means forming an antagonistic spring in order to close off, when the pressure of the water reaches said predetermined maximum value, the passage of this water toward the chamber of the control jack.

The invention may thus be implemented in a very simple fashion.

According to a preferred version of the invention, the second part of the control jack constitutes an intermediate part and is, at its end opposite the first part of said jack, shaped so as to form the first part, movable with respect to the second part, which is fixed to the chassis of the machine, of the second isolating jack, and the chamber of the second jack has an internal diameter smaller than the internal diameter of the chamber of the first jack and communicates with said chamber via a passage provided in said intermediate part.

Thus, when the pressure of the water is sufficient to overcome the force of the means forming a spring, and due to the difference between the internal diameters of the two chambers, the intermediate part moves with respect to the second part of the second isolating jack: when this second jack reaches its retracted position, the intermediate part prevents the passage of the water coming from the pump and causes the deployment of the first control jack to be halted.

Further particular features and advantages of the present invention will become apparent in the following detailed description.

In the appended drawings, given solely in a non-limiting manner:

Figure 1:
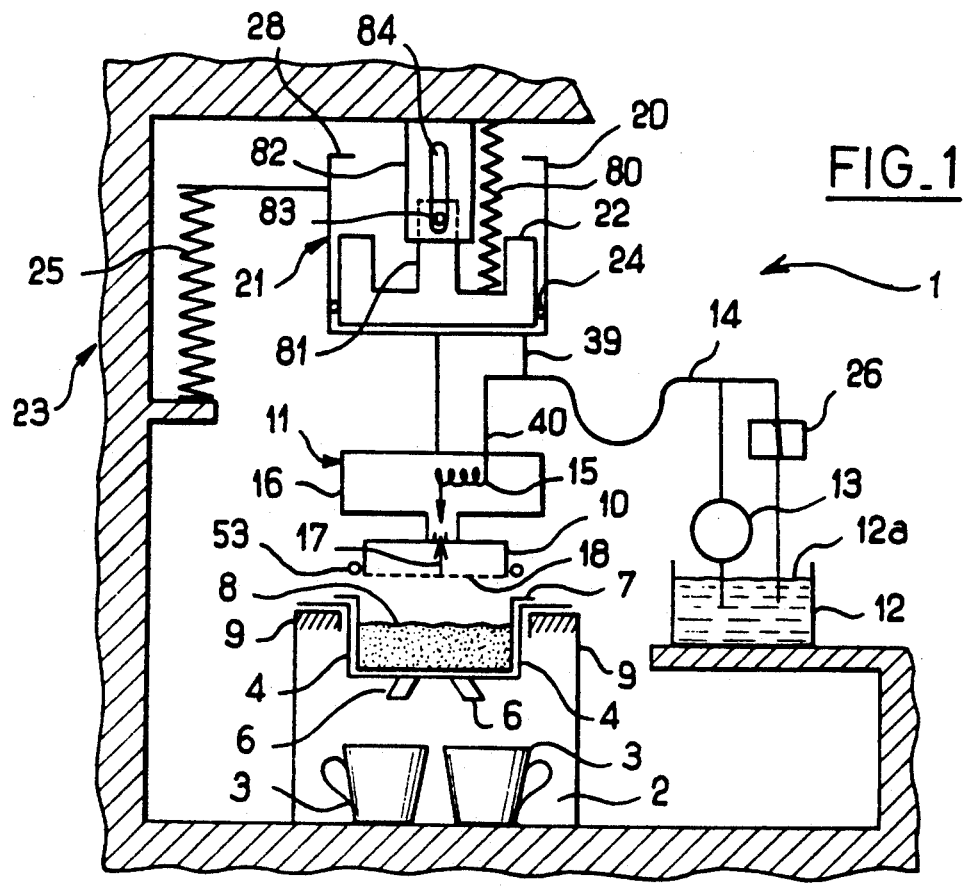
FIG. 1 is a skeleton diagram, partially in cross section, of a first embodiment of the present invention, the machine being shown in its state before a new operating cycle.
Figure 2:
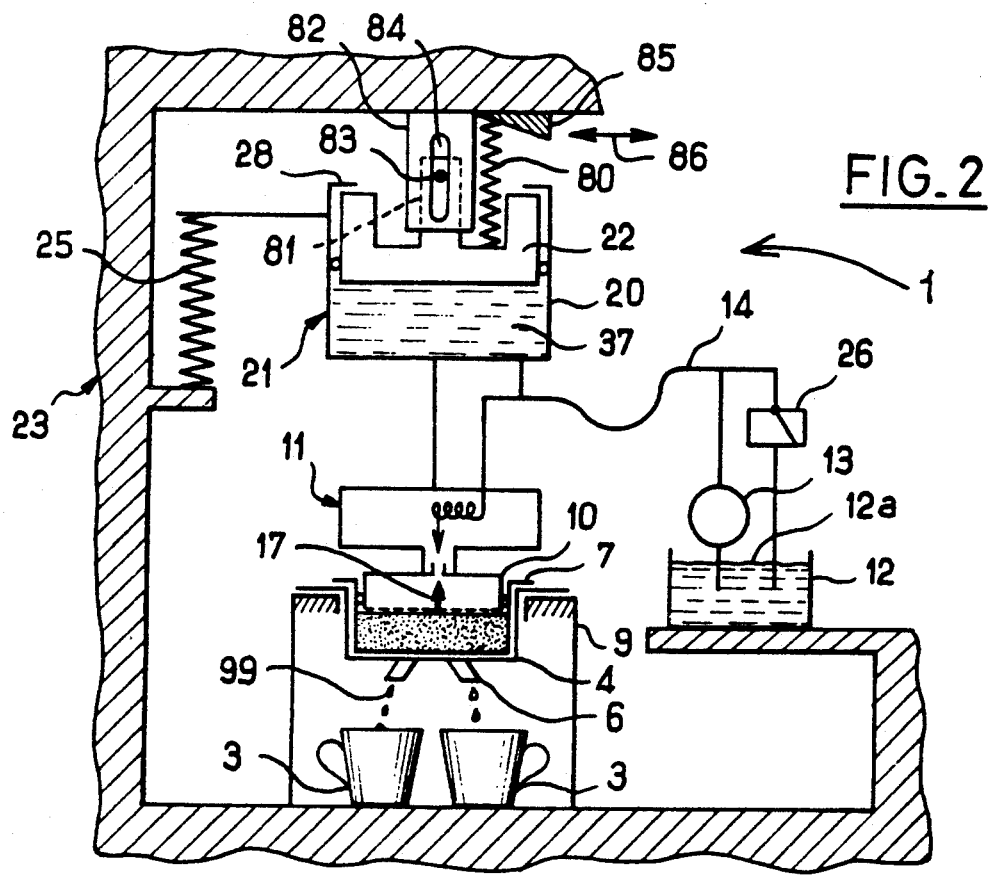
FIG. 2 is a view similar to FIG. 1, the machine being shown in its state during the extraction of coffee.

In the embodiment shown in FIGS. 1 and 2, the espresso coffee machine 1 comprises a base 2 intended to receive a cup 3 which is placed under the filter holder 4.

In a known manner, the filter holder 4 comprises, in its lower part, two tubular nozzles 6 intended to guide the infusion of coffee toward the cups 3.

A filter 7 intended to receive the ground coffee 8 is placed on the filter holder 4. It may be of any model and, for example, be a conventional perforated metallic dish or a "frother" filter adapted to produce froth which is appreciated by the consumer, such as that described in French Patent Application 2,655,529, in the name of the Applicant.

The filter 7 is intended to receive a quantity of ground coffee 8 which is a function of the number of cups 3 to be filled. It is deposited on a stationary support shown diagrammatically at 9: it is thus placed directly under the boiler snout 10 which is securely attached to the boiler 11.

The coffee machine 1 comprises a reservoir 12 of water containing a reserve of water 12a, and a pump 13 intended to pump this water 12a in order to feed the boiler 11 via a water pipe 14.

The espresso coffee machine 1 comprises a boiler 11 for heating the pressurized water supplied by a pump 13 and intended to be injected into the ground coffee 8 contained in a filter 7 placed on a support 9. It also comprises a snout 10 adapted to penetrate, during each operating cycle of the machine 1, inside the filter 7 so as to compress the ground coffee 8. The snout 10 is mounted in a sliding manner with respect to the chassis 23 of the machine 1, by means of a hydraulic control jack 21 actuated by the water supplied by the pump 13. The machine 1 also comprises a flap valve 17 preventing the passage of the water from the boiler 11 toward the filter 7 while the pressure of the water downstream of the pump 13 is below a predetermined minimum value.

The snout 10 is carried by a first part 20, the cylinder in the example shown, which is movable, against the action of an antagonistic spring 25, with respect to the second part 22, in this case the piston, which is connected to the chassis 23 of the machine 1, of the control jack 21.

According to the invention, the support 9 of the filter 7 is stationary, and the piston 22 of the jack 21 is mounted so as to be able to move with respect to the chassis 23 of the machine 1 against the action of an antagonistic spring 80 which is mounted between the piston 22 and the chassis 23.

The cylinder 20 carries, at the free end of its peripheral wall, a stop 28 which bears on the wall of the piston 22 in order to limit the movement of the cylinder 20 with respect to the piston 22 upon full deployment of the jack 21.

It will be seen in FIGS. 1 and 2 that the piston 22 is mounted in a sliding manner with respect to the chassis 23; it comprises an axial shaft 81 which slides inside a sleeve 82 fixed to the chassis 23. The shaft 81 is traversed radially by a pin 83 which projects through a longitudinal guiding aperture 84 provided in the wall of the sleeve 82.

It will be seen in FIG. 2 that it is possible to insert a wedge 85 between the chassis 23 and the spring 80. It is thus possible to adjust the value of the resistance opposed, by the spring 80, to the deployment of the jack 21, by moving the wedge 85 in one direction or the other according to the double arrow 86. The wedge 85 is similar to the element 75 described in the abovementioned prior application.

In the embodiment shown in FIGS. 3 to 7, the machine comprises means for preventing the intake, inside the chamber 37 of the jack 21, of pressurized water coming from the pump 13 when the pressure of this water reaches a predetermined maximum value below the pressure causing the opening of the flap valve 17.

These preventing means comprise a second hydraulic isolating jack 87 also actuated by the pressurized water coming from the pump 13.

The piston 88 of the control jack 21 forms an intermediate part which is common to both jacks 21 and 87: it comprises a central shaft 88a which extends in the opposite direction from the cylinder 20. The free end of this shaft 88a is shaped so as to form the piston, movable with respect to the cylinder 89 which is fixed to the chassis 23 of the machine 1, of the second isolating jack 87.

The chamber 90 of the second jack 87 has an internal diameter smaller than the internal diameter of the chamber 37 of the first jack 21, and communicates with said chamber 37 via an axial passage 91 provided in said intermediate part 88. The tubing 92 for conveying pressurized water coming from the pump 13 emerges in an opening 93 provided in the peripheral wall 94 of the chamber 90 of the second isolating jack 87. Furthermore, the second jack 87 comprises sealing means 95 for isolating the opening 93 and the passage 91 from each other in a leak tight manner when the second jack 87 is in the retracted position As will be seen, in detail, in FIGS. 5 to 7, the sealing means 95 consist of an annular gasket 95 mounted around the passage 91 o the axial end face of the shaft 88a, limiting the chamber 90 of the second jack 87. The gasket 95 is adapted to bear in a leaktight fashion on the corresponding inner face 96 of the cylinder 89 of the jack 87.

The shaft 88a has a peripheral annular gasket 97 which provides the seal between the shaft 88a and the inner peripheral wall 94 of the cylinder 89.

The element forming a spring 98 consists of an annular element made from elastomer mounted between the shaft 88a and the chassis 23 of the machine 1.

In the example shown, the annular element 98 surrounds the shaft 88a and bears on the end of the peripheral wall of the cylinder 89.

It is known that such an element made from elastomer is capable of yielding in an elastic manner when it is compressed with a certain force, and of resuming its initial dimensions when this compression force ceases. It is, moreover, known to predetermine the value of the force for which such an element made form elastomer yields, by suitably choosing the dimensions of the element, the nature and the composition of the elastomer, and the nature and the proportion of any inorganic filler mixed with the elastomer to modify its hardness.

A description will now be given of the method of operation of the two embodiments described above.

The first embodiment is shown diagrammatically in FIG. 1 in the rest state, ready for a new operating cycle. The filter 7 is filled with fresh ground coffee 8. The pump 13 is halted. The valve 26 is open. The boiler is full of water. The jack 21 is in the retracted position through the action of the spring 25 and the piston 22 is in its deployed position with respect to the sleeve 82 through the action of the spring 80 whose force is greater than that of the spring 25.

The method of operation may be inferred from that described in the abovementioned prior French Application No. 91/01,147; the pressurized water coming from the pump 13 penetrates into the chamber 37 of the jack and causes the deployment of the latter: in a first stage, the cylinder 20 slides with respect to the piston 22, against the force of the spring 25, until the snout 10 penetrating inside the filter 7 compresses the ground coffee 8. As of this moment, the pressure of the water increases and causes the piston 22 to slide with respect to the sleeve 82 until the stop 28 limits the deployment of the jack 21: the pressure then increases up to the value which is necessary to cause the opening of the flap valve 17 and the extraction of the coffee, as shown in FIG. 2 in which the drops 99 of coffee falling into the cups 3 have been shown diagrammatically.

This embodiment makes it possible to automatically adapt the quantity of ground coffee present in the filter 7 and to limit the force of compression of the latter to the value of the difference between the respective forces of the springs 80 and 25.

The embodiment shown in FIGS. 3 to 7 operates, in the first stage of the cycle, like the preceding embodiment.

Figure 3:
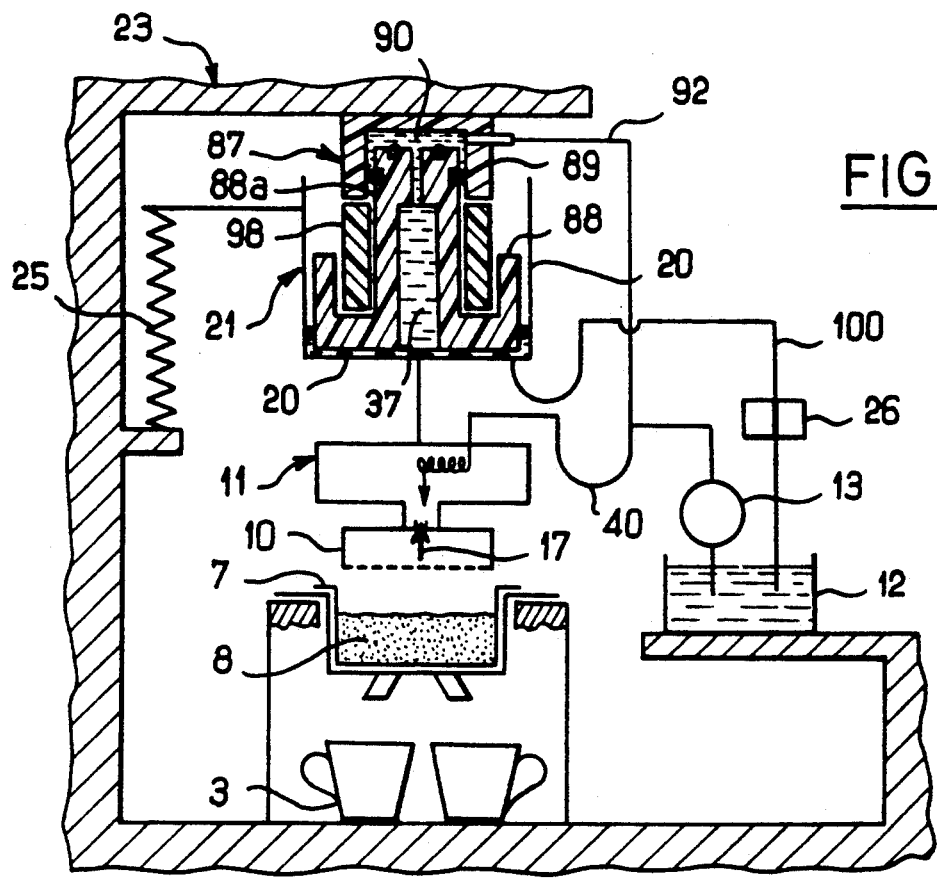
FIG. 3 is a view similar to FIG. 1 of a second embodiment of the present invention.
Figure 4:
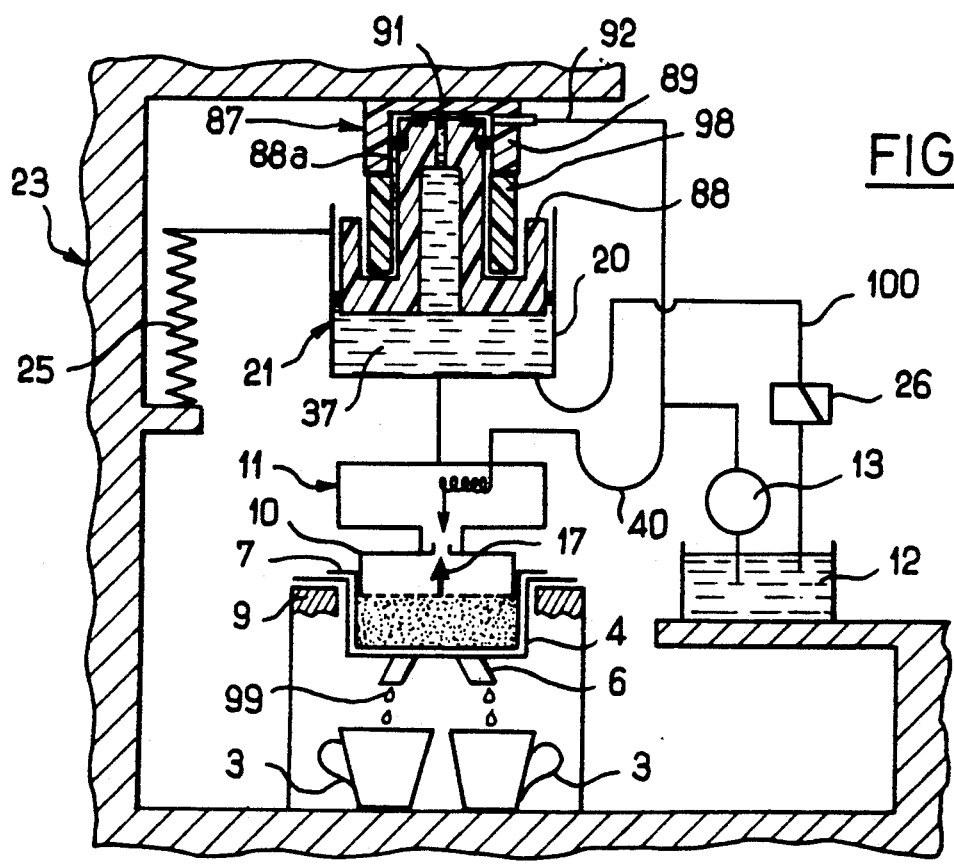
FIG. 4 is a view similar to FIG. 2 of the machine shown diagrammatically in FIG. 3.
Figure 5:
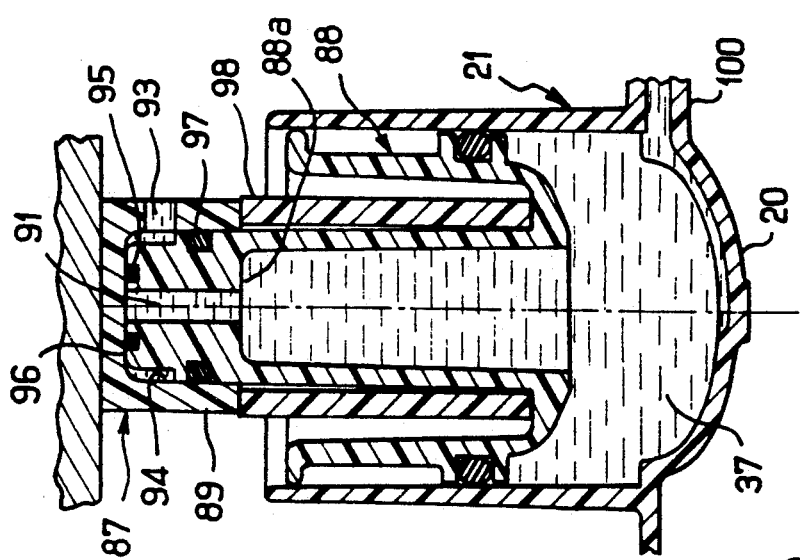
FIG. 5 is an enlarged view in cross section of a detail of FIG. 3, the control jack being in its retracted position before a new operating cycle.

In the rest state, shown in FIGS. 3 and 5, the jack 21 is in the retracted position, the element 98 made from elastomer has its normal dimension, and the shaft 88a of the jack 87 is in its exit position.

Figure 6:
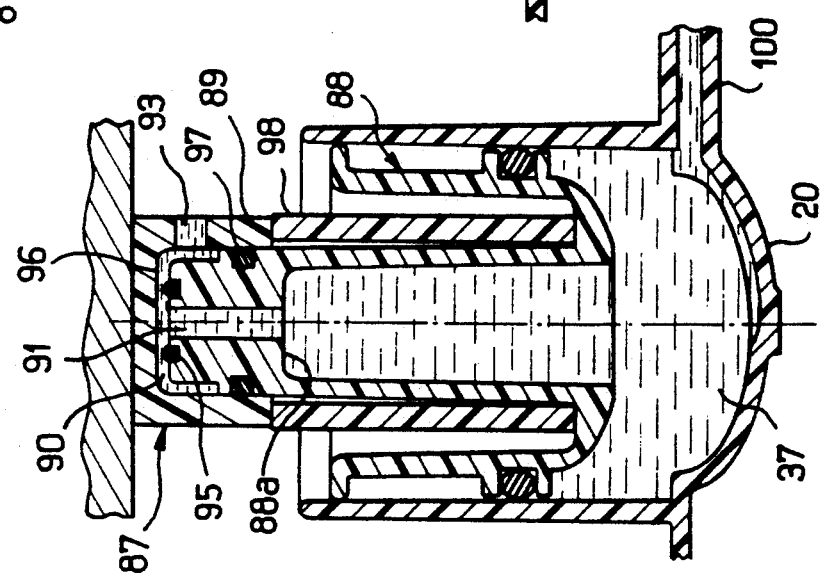
FIG. 6 is a view similar to FIG. 5, the control jack being in its intermediate position.
Figure 7:
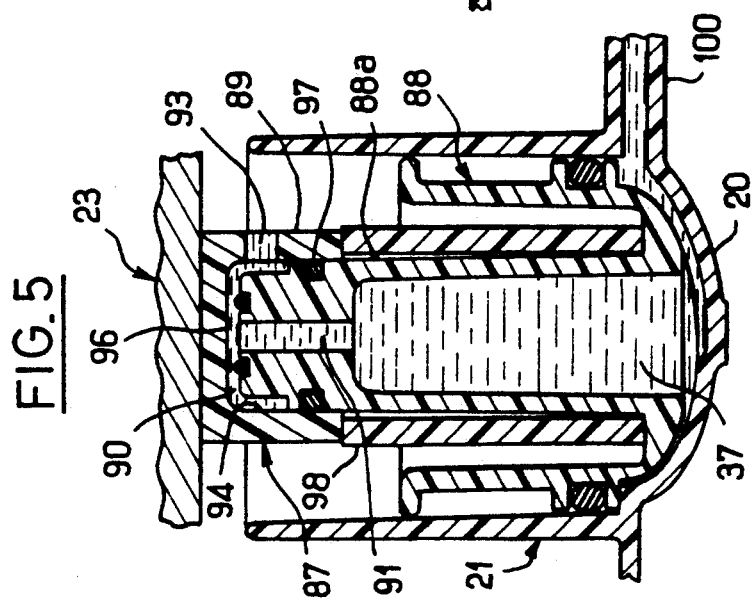
FIG. 7 is a view similar to FIG. 5, the control jack being in its final deployed position, the intake of water being prevented after yielding of the element forming a spring.

In the first stage of an operating cycle, the pressurized water coming from the pump 13 arrives via the tubing 92 and the opening 93 into the chamber 90, and via the passage 91 in the chamber 37 in order to cause the deployment of the cylinder 20 against the force of the spring 25. The cylinder 20 slides until the snout 10 penetrating inside the filter 7 compresses the ground coffee 8. The element 98 still has its initial dimension, the shaft 88a is still in its exit position, as shown in FIG. 6, and the pressure of the water increases.

The annular element 98 yields when the difference between the force of pressure of the water on the face of the piston 88 closing the chamber 37 and the corresponding force being exerted on the face of the shaft 88a closing the chamber 90 reaches the resistance to the compression of said element: the piston 88 slides in the direction corresponding to the full deployment of the jack 21 and to the withdrawal of the jack 87 until the gasket 95 isolates the opening 93 from the passage 91. There is thus no need for a stop.

As of this moment, the pressure of the water in the chamber 37 and 90 remains constant and determines the compression force that the snout 10 exerts on the ground coffee 8. The pressure of the water existing the pump continues to increase up to the value which causes the opening of the flap valve 17. This is the position shown in FIGS. 4 and 7.

In order to permit discharge of the water form the chamber 37 and the withdrawal of the jack 21, the tubing 100 for discharging the water, on which the valve 26 is mounted, obviously emerges in the chamber 37. As soon as the valve 26 opens, the element 98 resumes its normal dimension and pushes back the piston 88, then the spring 25 commands the return of the cylinder 20 and the withdrawal of the jack 21.

Of course, the present invention is not limited to the embodiments which have just been described, and it is possible to make numerous changes and modification to the latter without departing from the field of the invention.

It is thus possible to reverse the respective functions of the piston and of the cylinder of each of the jacks, to modify the form, the nature and the arrangement of the elements forming springs, and to replace the elements described by equivalent elements fulfilling the same function in order to achieve the same result.

The isolating jack may have a form, a structure and an arrangement which are different from those described. It may be independent of the jack 21.

It is thus possible to replace the annular element 98 made form elastomer by one or more elements made from elastomer of different forms, or by one or more springs.

It is also possible to make all the changes and modifications, described in the abovementioned prior application, to the present invention.

We claim:

1. An espresso coffee machine (1), comprising a boiler (11) for heating pressurized water supplied by a pump (13) and intended to be injected into ground coffee (8) contained in filter means (7) which are placed on a support (9), and a snout (10) adapted to penetrate, during each operating cycle of the machine (1), inside the filter means (7) said snout (10) begin mounted in a sliding manner relative to the chassis (23) of the machine (1) by means of at least one hydraulic control jack (21) carried by the machine and actuated by water supplied by said pump (13), the machine (1) also comprising means forming a flap valve (17) preventing the passage of the water from the boiler (11) toward the filter means (7) while the pressure of the water downstream of the pump (13) is below a predetermined minimum value, the snout (10) being carried by a first part (20) of said jack (21) which is movable relative to a second part (22, 82) of said jack (21) which is connected to the chassis (23) of the machine (1), wherein the support (9) of the filter means (7) is stationary, wherein the second part (22, 82) of the jack (21) is mounted so as to be able, through the action of pressurized water supplied by the pump (13), to be moved relative to the chassis (23) of the machine (1) against the action of means forming an antagonistic spring (80, 98) when the first part (20) is immobilized because the snout (10) s in contact with the ground coffee (8), in order to permit, before the opening of the means forming a flap valve (17), the optimum deployment of the jack (21), this optimum deployment begin limited by halting means (21, 87) so as to limit the force of compression of the ground coffee (8) by the snout (10).

2. The espresso coffee machine as claimed in claim 1, wherein the halting means (28) consist of stop means (28) limiting the relative movement of the first part (20) with respect to the second part (22) of the jack (21) upon full deployment of said jack (21).

3. The espresso coffee machine as claimed in claim 2, wherein a portion of the second part (22, 82) of the jack (21) is mounted in a sliding manner with respect to another portion of said second part (22, 82) of the jack (21) comprising guiding means (82) fixed to the chassis (23) of the machine (1), and wherein mean forming a spring (80) are inserted between said second part (22) and the chassis (23) of the machine (1).

4. The espresso coffee machine as claimed in claim 1, wherein the halting means (87) consist of means (87) for preventing the intake, inside the chamber (37) of the jack (21), of pressurized water coming form the pump (13) when the pressure of the this water reaches a predetermined maximum value below the pressure causing the opening of the means forming a flap valve (17).

5. The espresso coffee machine as claimed in claim 1, wherein said preventing means (87) comprise a second hydraulic isolating jack (87) also actuated by the pressurized water coming from the pump (13).

6. The espresso coffee machine as claimed in claim 5, wherein a first part (88a) movable with respect to the second part (89), of said second isolating jack (87) moves against the action of means forming an antagonistic spring (98) in order to close off, when the pressure of the water reaches said predetermined maximum value, the passage of this water toward the chamber (37) of the control jack (21).

7. The espresso coffee machine as claimed in claim 6, wherein the second part (22, 82) of the control jack (21) constitutes an intermediate part (88) and is, at its end (88a) opposite the first part (20) of said jack (21), shaped so as to from the first part (88a) of said isolating jack (87), movable with respect to the second part (89) of said isolating jack (87), with is fixed to the chassis (23) of the machine (1).

8. The espresso coffee machine as claimed in claim 7, wherein the chamber (90) of the second jack (87) has an internal diameter smaller than the internal diameter of the chamber (37) of the first jack (21) and communicates with said chamber (37) via a passage (91) provided in said intermediate part (88).

9. The espresso coffee machine as claimed in claim 8, wherein tubing (92) for conveying pressurized water coming from the pump (13) emerges in an opening (93) provided in a wall (94) of the chamber (90) of the second isolating jack (87), and wherein said second jack (87) comprises sealing means (95) for isolating the opening (93) and the passage (91) from each other in a leaktight manner when said second jack (87) is in the retracted position.

10. The espresso coffee machine as claimed in claim 9, the passage (91) being substantially axial, wherein the sealing means (95) consist of an annular gasket (95) mounted around the passage (91) on an axial end face of the first part (88a) of the second jack (87) limiting the chamber (90) of said second jack (87) and adapted to bear in a leaktight fashion to the corresponding inner face (96) of the second part (89) of said second jack (87).

11. The espresso coffee machine as claimed in claim 6, wherein the element forming a spring (98) consists of at least one element made form elastomer mounted between the first part (88a) of the second jack (87) and the chassis (23) of the machine (1).

12. The espresso coffee machine as claimed in claim 11, wherein the element forming a spring (98) made from elastomer is an annular element (98) surrounding at least a part (88a) of the second jack (87).

* * * * *